United States Patent [19]

Makino et al.

[11] 4,378,324

[45] Mar. 29, 1983

[54] PROCESS FOR PREPARING AROMATIC POLYIMIDE SEMIPERMEABLE MEMBRANES

[75] Inventors: Hiroshi Makino; Yoshihiro Kusuki; Hiroshi Yoshida, all of Ichihara; Asumaru Nakamura, Chiba, all of Japan

[73] Assignee: Ube Industries, Ltd., Yamaguchi, Japan

[21] Appl. No.: 171,336

[22] Filed: Jul. 23, 1980

[30] Foreign Application Priority Data

Jul. 26, 1979 [JP] Japan .................................. 54-94240
Mar. 11, 1980 [JP] Japan .................................. 55-29786

[51] Int. Cl.³ .............................................. B29D 27/00
[52] U.S. Cl. .................................. 264/41; 210/500.2; 264/184; 264/216; 264/235; 264/331.19; 264/DIG. 62
[58] Field of Search ................. 264/41, 184, DIG. 62, 264/216, 235, 331.19; 210/500.2

[56] References Cited

U.S. PATENT DOCUMENTS

| | | | |
|---|---|---|---|
| Re. 30,351 | 7/1980 | Hoehn | 210/500.2 |
| 3,816,303 | 6/1974 | Wrasidlo | 210/500.2 |
| 3,822,202 | 7/1974 | Hoehn | 210/500.2 |
| 3,899,309 | 8/1975 | Hoehn et al. | 210/500.2 |
| 4,113,628 | 9/1978 | Alegranti | 264/41 |
| 4,240,914 | 12/1980 | Iwama et al. | 264/41 |
| 4,272,467 | 10/1981 | Johnson | 264/41 |

FOREIGN PATENT DOCUMENTS 1212758 11/1970 United Kingdom .................. 264/41

*Primary Examiner*—James B. Lowe
*Attorney, Agent, or Firm*—Burgess, Ryan and Wayne

[57] ABSTRACT

A polyimide semipermeable membrane is prepared by the process comprising the steps of:

preparing a solution of a polyimide material consisting essentially of at least one aromatic polyimide comprising at least 90 molar % of at least one recurring unit of the formula (I):

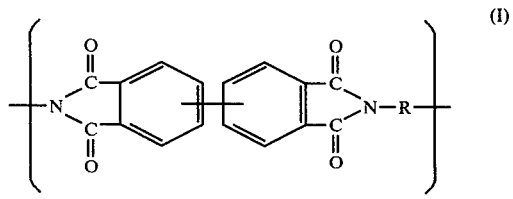

wherein R represents a divalent aromatic radical, in a solvent consisting of at least one phenol compound in the state of a liquid or melt;

forming a thin layer of the polyimide solution, and;

coagulating the thin layer of the polyimide solution by bringing the thin layer into contact with a coagulating liquid to form a semipermeable membrane.

25 Claims, No Drawings

PROCESS FOR PREPARING AROMATIC POLYIMIDE SEMIPERMEABLE MEMBRANES

FIELD OF THE INVENTION

The present invention relates to a process for preparing a polyimide semipermeable membrane. More particularly, the present invention relates to a process for preparing an aromatic polyimide semipermeable membrane, which is semipermeable for a solution or a gas mixture, directly from a solution of the aromatic polyimide.

BACKGROUND OF THE INVENTION

It is known to produce a semipermeable membrane from a cellulose acetate. The cellulose acetate semipermeable membrane is prepared in such a manner that: a dope (solution) is prepared by dissolving a cellulose acetate in a mixed solvent consisting of acetone and formamide or a mixture of a metal salt such as $Mg(ClO_4)_2$, water and acetone; a thin layer of the dope is formed on a base surface; a portion of the mixed solvent is evaporated from a surface of the thin layer of the dope, and; then, the thin layer of the dope is immersed in cold water to coagulate it and form a semipermeable membrane. However, the conventional semipermeable membrane consisting of the cellulose acetate is unsatisfactory in its heat-resisting property, resistance to chemicals, anti-bacterial property, resistances to acid and base, resistance to compression, and resistance to chlorine.

In order to obtain a semipermeable membrane having a satisfactory heat-resisting property, chemical-resisting property and compression-resisting property, various attempts have been made to prepare a semipermeable membrane from various aromatic polyamides and aromatic polyimides. In this regard, it was expected that semipermeable membranes having excellent heat-resisting and chemical-resisting properties, and mechanical properties, could be provided from aromatic polyimide type materials. However, an aromatic polyimide semipermeable membrane could be prepared only by very complicated processes that is, in one conventional process, the aromatic polyimide semipermeable membrane can only be produced in such a complicated manner that: a solution of a polyamic acid which has been produced by a polymerization reaction of an aromatic tetracarboxylic dianhydride with an aromatic diamine is prepared; a thin layer is formed from the solution; the thin layer of the solution is coagulated by using a coagulating liquid to provide a polyamic acid membrane, and; then, the polyamic acid membrane is imidized to provide a polyimide semipermeable membrane. In another conventional process, the aromatic polyimide semipermeable membrane can only be produced in such a complicated manner that: a thin layer of a solution of a polyamic acid is formed while partially imidizing the polyamic acid; the thin layer of the partially imidized polyamic acid solution is coagulated with a coagulating liquid, and; finally, the coagulated partially imidized polyamic acid membrane is completely imidized. In still another conventional process, the aromatic polyimide semipermeable membrane can only be produced in such a complicated manner that: a thin layer of a polyamic acid solution is coagulated with a coagulating liquid containing an imidizing agent while imidizing the polyamic acid, and; then, the coagulated polyimide membrane is heated to provide a polyimide semipermeable membrane.

As is clear from the above explanations, in the conventional processes, it is necessary to convert the polyamic acid to an aromatic polyimide by imidizing it during or after preparing the thin layer of the polyamic acid solution, and/or during or after coagulating the thin layer of the polyamic acid solution. Therefore, it is very difficult to precisely control the thin layer-forming, imidizing and coagulating procedures, so as to obtain products having a uniform and satisfactory semipermeable property. Furthermore, the aromatic polyimide semipermeable membranes produced by the conventional processes exhibit an unsatisfactory water-permeability and/or salt-rejection.

British Pat. No. 1,435,151 discloses a process for producing a semipermeable polyimide membrane in such a manner that: a thin layer of a solution of a polyamic acid, which has been produced by a polymerization reaction of an aromatic tetracarboxylic dianhydride with an aromatic diamine, is formed, and; the thin layer is coagulated with a coagulating liquid while imidizing the polyamic acid to convert it into an aromatic polyimide.

Furthermore, it is known that the dope (solution) of the polyamic acid is unstable and cannot be stored for a long period of time. Therefore, it is desired to provide a new process for producing the polyimide membrane without using the unstable polyamic acid solution.

U.S. Pat. No. 3,822,202 and U.S. Pat. No. 3,899,309 disclose another process for producing a gas-separating polyimide membrane. In this process: a specific aromatic polyimide, which contains a backbone chain and at least one rigid divalent sub-unit having two single bonds which extend from the sub-unit to the backbone chain and which are not co-linear to each other, the rigid divalent sub-unit being not capable of rotating at an angle of 360 degrees around at least one of the single bonds, and at least 50% of the atoms in the backbone chain being located in aromatic radicals in the backbone chain, is dissolved in an organic solvent such as dimethyl acetamide; the solution is spread to form a thin layer, and; the thin layer of the solution is dried to form a gas-separating membrane.

However, the gas-separating property of the polyimide membranes produced by any of the above-mentioned known processes is unsatisfactory.

SUMMARY OF THE INVENTION

An object of the present invention is to provide a process for preparing a polyimide membrane having a porous layer and exhibiting an excellent permeability.

Another object of the present invention is to provide a process for preparing a polyimide membrane having a porous layer, directly from a polyimide material.

Still another object of the present invention is to provide a process for preparing a polyimide membrane having a porous layer, which process is simple and capable of being easily controlled so as to stably produce the membrane having a uniform quality.

A further object of the present invention is to provide a process for preparing a polyimide membrane having a porous layer, without using an unstable polyamic acid solution.

The above-mentioned objects can be attained by the process of the present invention which comprises the steps of:

Preparing a solution of a polyimide material consisting essentially of at least one aromatic polyimide comprising at least 90 molar % of at least one recurring unit of the formula (I):

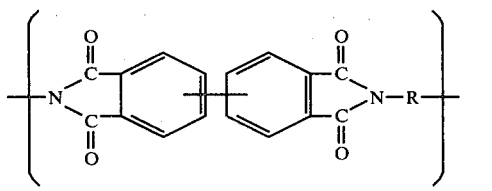

wherein R represents a divalent aromatic radical, in a solvent consisting of at least one phenol compound in the state of a liquid or melt;

forming a thin layer of said polyimide solution, and;

coagulating said thin layer of said polyimide solution by bringing said thin layer into contact with a coagulating liquid to form a semipermeable membrane having a porous layer.

It is important to note that the process of the present invention contains no procedure for converting a polyamic acid into a polyimide, which converting procedure is indispensably contained in the conventional processes for producing the polyimide membrane. Therefore, in the process of the present invention, the step of forming a thin layer of the polyimide solution and the step of coagulating the thin layer into a solid layer are very simple, and can be easily and precisely controlled.

The resultant polyimide membranes from the process of the present invention exhibit a more excellent water-permeability, gas-permeability and salt-rejection than of the membranes produced by the conventional processes, and have similar or superior resistances to heat, chemicals and compression, and mechanical properties, as compared with the conventional processes.

DETAILED DESCRIPTION OF THE INVENTION

The term "degree of imidization" used hereinafter refers to a proportion, in percent of the number of imide bonds contained in a real polymer, consisting of a number of monomeric moieties which are bonded to each other by imide bonds and other bonds capable of being converted to the imide bonds, to the number of the imide bonds contained to an imaginary perfect polyimide, which corresponds to the real polymer and in which the monomeric moieties are bonded only by the imide bonds. That is, the degree of imidization of the imaginary perfect polyimide is 100% and that of a real polymer containing no imide bond is zero. The degree of imidization is determined from height of absorption peaks at 1780 cm$^{-1}$ and 1720 cm$^{-1}$ in the infrared ray absorption spectrum of the polyimide.

In the process of the present invention, a polyimide material is dissolved in a solvent to prepare a dope (solution) of the polyimide polymer. The polyimide material consists essentially of at least one aromatic polyimide comprising at least 90 molar %, preferably, at least 95 molar %, of at least one recurring unit of the formula (I):

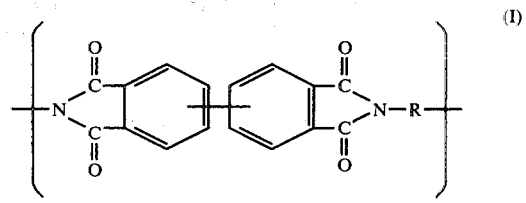

wherein R represents a divalent aromatic radical.

It is preferable that the aromatic polyimide (imide polymer) material exhibit a logarithmic (inherent) viscosity of from 0.3 to 7.0, more preferably, from 0.4 to 5.0, still more preferably, from 5.0 to 4.0, determined at a concentration of 0.5 g per 100 ml of a mixture of 4 parts by volume of p-chlorophenol and 1 parts by volume of o-chlorophenol at a temperature of 30° C. The recurring unit of the formula (I) involves those of the formulae (II) and (III):

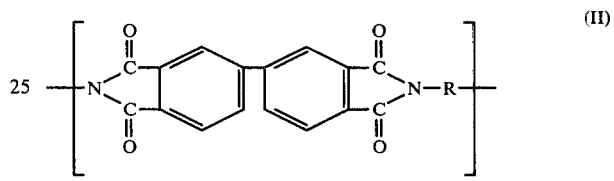

and

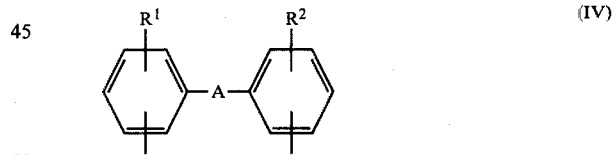

The divalent aromatic radical represented by R in the formula (I) may be selected from the group consisting of those of the formulae (IV) through (IX):

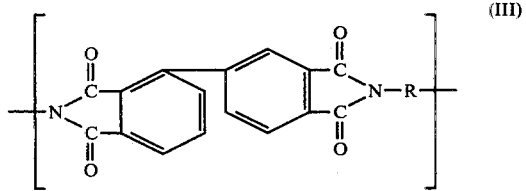

wherein R$^1$ and R$^2$ respectively represent, independently from each other, a member selected from the group consisting of a hydrogen atom, lower alkyl radical having 1 to 3 carbon atoms and lower alkoxy radicals having 1 to 3 carbon atoms, and A represents a divalent bond selected from the group consisting of —O—, —S—, —CO—, —SO$_2$—, —SO—, —CH$_2$— and —C(CH$_3$)$_2$—, and;

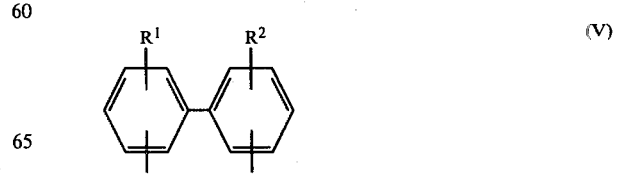

wherein R$^1$ and R$^2$ are as defined above.

The aromatic polyimide may comprise at least one recurring unit of the formula (I) in which R represents a divalent aromatic radical of the formula (IV) and at least one recurring unit of the formula (I) in which R represents a divalent aromatic radical selected from the group consisting of those of the formula (VI) to (IX):

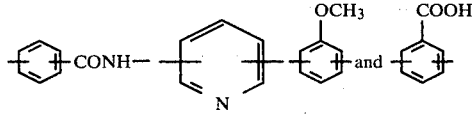

(VI)   (VII)   (VIII)   (IX)

The aromatic imide polymer may be one which has been prepared by the polymerization and the imide ring cyclization of a tetracarboxylic acid component comprising 90 molar %, and more preferably, 95 molar % or more, of biphenyl tetracarboxylic acid of the formula (X)

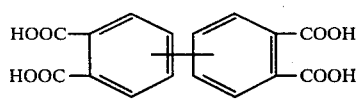

or its anhydride, salt or ester, with an aromatic diamine component consisting essentially of at least one member selected from the group consisting of diamine compounds of the formula (XI):

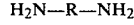   (XI)

wherein R is the same as that defined above.

The biphenyl tetracarboxylic acid of the formula (X) is selected from 2,3,3',4'-biphenyl tetracarboxylic acid and 3,3',4,4'-biphenyl tetracarboxylic acid. Each of the above-mentioned biphenyl tetracarboxylic acids may be in the form of its free acid, anhydride, salt or ester, preferably, anhydride.

The tetracarboxylic acid component may contain 10 molar % or less, preferably, 5 molar % or less, of at least one additional tetracarboxylic acid selected from the group consisting of pyromellitic acid, 3,3',4,4'-benzophenone tetracarboxylic acid, 2,2-bis(3,4-dicarboxyphenyl)propane, bis(3,4-dicarboxyphenyl)sulfone, bis(3,4-dicarboxyphenyl)ether, bis(3,4-dicarboxyphenyl)thioether, butane tetracarboxylic acid, and anhydrides, salts and esters of the above-mentioned acids.

The aromatic diamine of the formula (XI) can be selected from the group consisting of those of the formulae (XII) to (XVII):

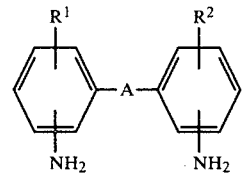

wherein $R^1$ and $R^2$ respectively represent, independently from each other, a member selected from the group consisting of a hydrogen atom, lower alkyl radical having 1 to 3 carbon atoms, and lower alkoxy radical having 1 to 3 carbon atoms, and A represents a divalent bond selected from the group consisting of —O—, —S—, —CO—, —SO₂—, —SO—, —CH₂— and —C(CH₃)₂—, and;

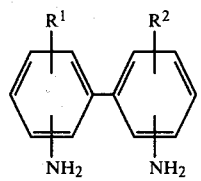

wherein $R^1$ and $R^2$ are as defined above.

The aromatic diamine component may comprise at least one aromatic diamine selected from the group consisting of those of the formula (XII) and at least one other aromatic diamine selected from the group consisting of those of the formulae (XIV) to (XVII):

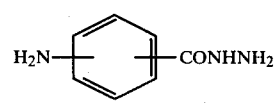

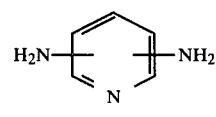

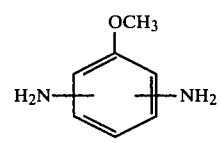

and

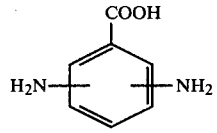

The aromatic diamine compound of the formula (XII) may be selected from the group consisting of diamino-diphenyl ether compounds, for example, 4,4'-diaminodiphenyl ether, 3,3'-dimethyl-4,4'-diaminodiphenyl ether, 3,3'-diaminodiphenyl ether and 3,3'-dimethoxy-4,4'-diaminodiphenyl ether; diaminodiphenyl thioether compounds, for example, 4,4'-diaminodiphenyl thioether, 3,3'-dimethyl-4,4'-diaminodiphenyl-thioether, 3,3'-diethoxy-4,4'-diaminodiphenyl-thioether, and, 3,3'-diaminodiphenyl thioether; diaminobenzophenone compounds, for example, 4,4'-diaminobenzophenone and 3,3'-dimethyl-4,4'-diaminobenzophenone; diaminodiphenyl methane compounds, for example, 4,4'-diaminodiphenyl methane, 3,3'-diaminodiphenyl methane, 3,3'-dimethoxy-4,4'-diaminodiphenyl methane and 3,3'-dimethyl-4,4'-diaminodiphenyl methane; diaminodiphenyl propane compounds, for example, 2,2-bis(4'-aminophenyl)propane and 2,2-bis(3'-aminophenyl)propane; 4,4'-diaminodiphenyl sulfoxide, and; diaminodiphenyl sulfons, for example, 4,4'-diaminodiphenyl sulfone; 3,3'-diaminodiphenyl sulfone, and 3,4'-diaminodiphenyl sulfone.

The aromatic diamine compound of the formula (XIII) may involve benzidine, 3,3'-dimethyl benzidine, 3,3'-dimethoxybenzidine and 3,3'-diaminobiphenyl.

The aromatic diamine compound of the formula (XIV) may be either 4-aminobenzhydrazide or 3-aminobenzhydrazide.

The aromatic diamine compound of the formula (XV) may be either 2,6-diaminopyridine or 2,5-diaminopyridine.

The aromatic diamine compound of the formula (XVI) may be either 4-methoxy-1,3-diaminobenzene or 3-methoxy-1,4-diaminobenzene.

The aromatic diamine compound of the formula (XVII) may be either 3,5-diaminobenzoic acid or 2,4-diaminobenzoic acid.

It is preferable that the aromatic diamine compound of the formula (XI) be selected from the group consisting of 4,4'-diaminodiphenyl ether, 4,4'-diaminodiphenyl thioether, 4,4'-diaminodiphenyl methane, benzidine, 3,3'-dimethoxybenzidine and 3,3'-dimethylbenzidine.

The aromatic diamine component may consist of 4,4'-diaminodiphenyl ether alone or a mixture of 40 molar % or more, preferably, 50 molar % or more, of 4,4'-diaminodiphenyl ether with the balance consisting of at least one other aromatic diamine selected from the group consisting of p-phenylene diamine, m-phenylene diamine, 4,4'-diaminodiphenyl thioether, 4,4'-diaminodiphenyl methane, 3,3'-dimethyl-4,4'-diaminodiphenyl ether, 3,3'-dimethylbenzidine, benzidine, benzidine sulfone, 4,4'-diaminodiphenyl sulfone, and 3,3'-diaminodiphenyl sulfone.

The polymerization and the imide ring cyclization of the tetracarboxylic acid component with the aromatic diamine component can be carried out by any conventional process. In a very preferable process for producing an imide polymer, a biphenyl tetracarboxylic acid component and an aromatic diamine component, which are in approximately equal molar amounts to each other, are dissolved in an organic polar solvent, for example, N-methylpyrrolidone, pyridine, N,N-dimethylacetamide, N,N-dimethylformamide, dimethyl sulfoxide, tetramethyl urea, phenol and cresol; the solution is heated at a temperature of 80° C. or less, preferably 0° to 60° C., so as to allow the biphenyl tetracarboxylic acid component and the aromatic diamine component to be polymerized with each other to provide a polyamic acid having a logarithmic viscosity of 0.3 or more, preferably, 0.7 to 7.0, determined at a concentration of 0.5 g per 100 ml of N-methyl pyrrolidone at a temperature of 30° C.; the solution of the polyamic acid in the organic polar solvent, which solution can be the above-mentioned polymerization reaction mixture itself, is subjected to an imidazation reaction at a temperature of from 5° to 150° C. by using an imidization accelerator consisting of at least one member selected from trimethyl amine, triethyl amine, pyridine, acetic anhydride, thionylchloride and carbodiimide, or at a temperature of from 100° to 300° C., preferably, from 120° to 250° C., without using the imidization accelerator, to provide an imide polymer having a degree of imidization of 90% or more, and; the resultant imide polymer is isolated from the reaction mixture by means of precipitation.

In another process for producing the imide polymer, the solution of the polyamic acid in the organic polar solvent, which solution has been prepared by the above-mentioned process and which has a logarithmic viscosity of 0.5 or more, determined at a concentration of 0.5 g per 100 ml of N-methylpyrrolidone at a temperature of 30° C., is mixed with a large amount of a precipitating agent consisting of acetone or an alcohol so as to allow the polyamic acid to precipitate from the solution, or the solution of the polyamic acid is mixed with the precipitating agent after evaporating the organic polar solvent from the solution so as to allow the polyamic acid to precipitate from the reaction mixture; the polyamic acid precipitate is isolated from the reaction mixture, and; the isolated polyamic acid is heated at a temperature of from 150° to 300° C., preferably, from 160° to 250° C., until the degree of imidization of the resultant imide polymer reaches 90% or more.

In still another process for producing the imide polymer, a biphenyltetracarboxylic acid component consisting of 2,3,3',4'- and/or 3,3',4,4'-biphenyltetracarboxylic acid and an aromatic diamine component consisting of at least one diamine compound of the formula (XI) are polymerized and imide ring cyclized in single step in a solvent consisting of at least one phenol compound in the state of a liquid or melt, at a temperature of from 120° to 400° C., preferably, from 150° to 300° C. This imide polymer-producing process is most preferable for the process of the present invention, because the resultant solution (dope) of the imide polymer in the phenol compound from this imide polymer-producing process can be directly utilized for the process of the present invention.

The aromatic imide polymer may comprise 50 to 95 molar % of a recurring unit of the formula (XVIII):

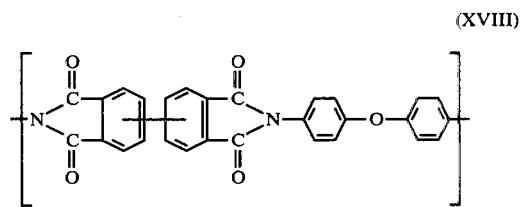

(XVIII)

and 5 to 40 molar % of at least one recurring unit selected from those of the formula (XIX):

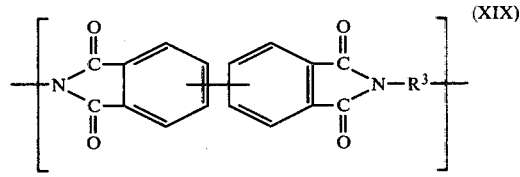

(XIX)

wherein R³ represents a member selected from the group consisting of:

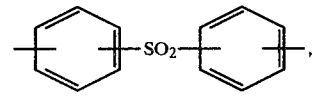

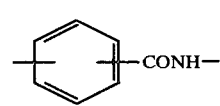

(VI)

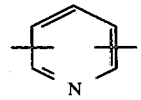

(VII)

-continued

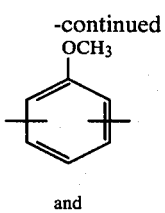
(VIII)

and

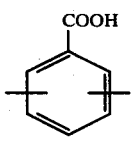
(IX)

In the above-mentioned aromatic imide polymer, it is preferable that the molar proportion of the recurring unit of the formula (XVIII) to the recurring unit of the formula (XIX) be in a range of from 95:5 to 60:40, more preferably, 90:10 to 70:30.

The phenol compound usable as a solvent for the process of the present invention preferably has a melting point not exceeding 100° C., more preferably, not exceeding 80° C. It is also preferable that the phenol compound have a boiling point not exceeding 300° C., more preferably, not exceeding 280° C., under atmospheric pressure. For example, the phenol compound may be selected from the group consisting of phenol, o-, m-, and p- cresols, 3, 5-xylenol, 1,4-xylenol, carvacrol, thymol and halogenated phenol compounds.

The halogenated phenol compounds are preferably of the formulae:

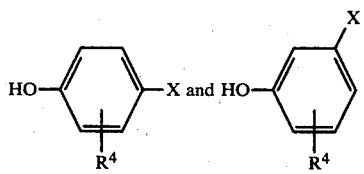

wherein R4 represents a member selected from the group consisting of a hydrogen atom, and alkyl radicals having 1 to 3 carbon atoms, for example, methyl, ethyl and propyl radicals, and X represents a halogen atom, such as a chlorine, bromine, fluorine or iodine atom.

The preferable halogenated phenol compound may involve 3-chlorophenol, 4-chlorophenol, 3-bromophenol, 4-bromophenol, 2-chloro-4-hydroxytoluene, 2-chloro-5-hydroxytoluene, 3-chloro-6-hydroxytoluene, 4-chloro-2-hydroxytoluene, 2-bromo-4-hydroxytoluene, 2-bromo-5-hydroxytoluene, 3-bromo-5-hydroxytoluene, 3-bromo-6-hydroxytoluene and 4-bromo-2-hydroxytoluene.

When the imide polymer material is prepared by such a single step (polycondensation-imide ring cyclization) process that a biphenyl-tetracarboxylic acid component and an aromatic diamine component are heated in a phenol compound solvent at a temperature of from 120° to 400° C., the resultant solution of the imide polymer material in the phenol compound solvent can be used for the process of the present invention, if necessary, after adjusting the concentration or viscosity of the resultant solution to a desired value. However, when the imide polymer has been obtained in the form of a powder, the imide polymer powder is suspended in a phenol compound solvent, and the suspension is heated to a temperature at which the imide polymer powder can be completely dissolved in the solvent.

In the process of the present invention, the imide polymer material may consist of a mixture of two or more different imide polymers each having the recurring unit of the formula (I), or a mixture of at least one imide polymer having the recurring unit of the formula (I) and one or more other aromatic imide polymer.

In an example of the process of the present invention, it is preferable that the imide polymer material consist of a high molecular weight aromatic imide polymer component having a logarithmic viscosity of from 0.8 to 7.0, more preferably, from 0.9 to 4,0, and a low molecular weight aromatic imide polymer component having a logarithmic viscosity of from 0.2 to 0.8. In the above-mentioned mixture, it is preferable that the ratio in weight of the high molecular weight imide polymer component to the low molecular weight imide polymer component be in a range of from 0.5:1 to 20:1, more preferably, from 0.8:1 to 15:1. This type of mixture is proper for producing an imide polymer semipermeable membrane having an excellent water-permeability. The high molecular weight imide polymer component consists of one or more imide polymers each having the recurring unit of the formula (I). The low molecular weight imide polymer component may contain, in addition to one or more imide polymers, each having the recurring unit of the formula (I), at least one other imide polymer, for example, obtained from 3,3',4,4'-benzophenone tetracarboxylic acid component and an aromatic diamine component, which polymer exhibits a relatively low molecular weight and a capability of being dissolved in the phenol compound solvent.

The solution of the above-mentioned mixture can be obtained by mixing solutions of the component imide polymers with each other or by adding and dissolving one or more component imide polymers in the form of a powder into at least one solution of a component imide polymer.

In the preparation of the solution of the imide polymer material, it is preferable that the concentration of the imide polymer material in the solution be 5% or more, more preferably, in a range of from 6 to 30%, still more preferably, from 8 to 25%, based on the entire weight of the solution. Also, it is preferable that the solution of imide polymer material be a homegenous liquid and exhibit a rotation viscosity of 1000, centipoises or more, more preferably, in a range of from 100 to 100,000 poises still more preferably, from 500 to 10,000 poises. The homogeneous solution having the above-mentioned rotation viscosity is proper for forming a thin layer of the solution.

The rotation viscosity of the solution can be determined by using a rotary viscometer (carrying the trademark VISCONIC-E and made by TOKYO KEIKI K.K.) at a temperature of 50° C.

If it is necessary, the solution of the imide polymer material is filtered, and/or subjected to a degassing procedure.

In the process of the present invention, the solution of the imide polymer material is formed into a thin layer, if necessary, while heating the solution to a temperature at which the solution exhibits a viscosity suitable for forming the thin layer. The thin layer of the solution may be in the form of a flat film, a hollow fiber or a tube.

The thin layer of the solution of the imide polymer material can be formed in accordance with a conventional thin layer-forming method in which a solution is spread on a base surface. For example, the solution of the imide polymer material is spread on a smooth surface of a flat base material, for example, a glass plate or copper plate, by using a doctor knife in order to obtain a uniform thickness of the thin layer of the solution.

In another method for forming the thin layer of the solution, the solution is spread on a smooth peripheral surface of a rotating drum by using doctor knife so as to obtain a uniform thickness of the thin layer of the solution.

In still another method for forming the thin layer of the solution, the solution is extruded through a T-die having a thin slit and the extruded thin layer of the solution is placed on a smooth peripheral surface of a rotating drum.

The above-mentioned drum method and T-die method are effective for continuously forming the thin layer of the solution.

During the thin layer-forming procedure, the temperature of the solution is maintained at a predetermined level at which the solution exhibits a proper rotation viscosity for forming the thin layer of the solution. The thin layer-forming temperature is preferably in a range of from 0° to 120° C., more preferably, from 10° to 100° C. Usually, the thickness of the thin layer of the solution is in a range of from 10 to 500 microns, preferably, from 20 to 200 microns.

During or after forming the thin layer of the solution, a portion of the phenol compound solvent may be evaporated from a surface of the thin layer of the solution. This evaporation procedure is effective for obtaining an asymetric semipermeable membrane by coagulating the partially evaporated thin layer of the solution.

In order to evaporate a portion of the phenol compound solvent from a surface of the thin layer of the solution, a stream of gas having a temperature of from 0° to 100° C., preferably, 5° to 90° C., is blown toward the surface of the thin layer of the solution placed on a surface of a flat plate or drum for one second or more, preferably, from 5 seconds to 30 minutes, more preferably, from 10 seconds to 20 minutes.

In another method for evaporating the phenol compound solvent, a reduced pressure is applied to the surface of the thin layer of the solution while heating the thin layer to a temperature at which the phenol compound solvent can be evaporated, for at least a few seconds, preferably, from 10 seconds to 30 minutes, more preferably, 30 seconds to 20 minutes.

In the process of the present invention, the thin layer of the solution of the imide polymer material is coagulated by bringing the thin layer into contact with a coagulating liquid which is compatible with the phenol compound solvent used. The coagulating liquid may consist of at least one member selected from the group consisting of: lower aliphatic alcohols having 1 to 5 carbon atoms, for example, methyl alcohol, ethyl alcohol and propyl alcohol; lower aliphatic ketones having 3 to 5 carbon atoms, for example, acetone, methylethylketone, diethylketone and methylpropylketone; ether type compounds, for example, tetrahydrofuran, dioxane, and ethyleneglycol monomethylether; amide type compounds, for example, dimethyl acetamide and dimethyl formamide; dimethylsulfoxide and mixtures of at least one member of the above-mentioned compounds with water. A preferable coagulating liquid consists of one part of water and 0.1 to 10 parts, more preferably, 0.2 to 5 parts, of the aliphatic alcohol, the aliphatic ketone, the ether type compound or the amide type compound.

The coagulating operation can be carried out by any conventional methods. However, it is preferable that the thin layer of the solution of the imide polymer material formed on a base surface be immersed in the coagulating liquid having a temperature of 80° C. or less, more preferably, in a range of from −10° to 30° C., even more preferably, from −5° to 20° C. In this coagulating procedure, the thin layer of the solution preferably has a temperature of 120° C. or less. The coagulating time is variable depending on the type of the imide polymer material, the type of the phenol compound solvent, the type of the coagulating liquid, etc. Usually, the thin layer of the solution is immersed in the coagulating liquid for a period of time of from 3 minutes to 20 hours, preferably, from 6 minutes to 10 hours.

The resultant coagulated membrane of the imide polymer material exhibits a semipermeable property which is useful in various ways. However, it is preferable to completely eliminate the residual phenol compound solvent from the coagulated membrane by immersing the coagulated membrane in a lower aliphatic alcohol such as methyl alcohol, ethyl alcohol or propyl alcohol, at a temperature of from 0° to 80° C., for from 6 minutes to 10 hours, and optionally by immersing the coagulated membrane in ion-exchanged water in order to eliminate the lower aliphatic alcohol, at a temperature of from 0° to 80° C., for from 30 minutes to 10 hours. Also, if it is necessary, the coagulated membrane is immersed in a hot polar solvent, for example, water or an organic polar solvent, at a temperature of 80° C. or more for from one minute to 120 minutes, preferably, from 5 to 60 minutes. This hot water treatment is effective for enhancing the salt-rejection and the thermal stability of the resultant semipermeable membrane.

The aromatic imide polymer semipermeable membrane prepared by the above-mentioned process exhibits an enhanced water-permeability and heat resistance, while keeping its salt-rejection at a high level.

In order to prepare a dry polyimide semipermeable membrane, it is preferable that the coagulated imide polymer membrane be washed with at least one member selected from the group consisting of lower aliphatic alcohols having 1 to 5 carbon atoms, for example, methyl alcohol, ethyl alcohol and propyl alcohol and lower aliphatic ketones having 3 to 5 carbon atoms, for example, acetone and methylethylketone, at a temperature of from 0° to 100° C. for 6 minutes to 10 hours, and, then, the washed imide polymer membrane is dried at a temperature of from 10° to 300° C.

It is desirable that the membrane containing substantially no water and solvent be subjected to the drying procedure. If the membrane to be dried contains a large amount of water and/or the phenol compound, the drying procedure causes the dried membrane to shrink and deform so as to deteriorate the gas-permeability of the membrane. When the coagulating liquid contains no water, usually, it is unnecessary to apply the above-mentioned water-eliminating treatment to the coagulated membrane.

The drying procedure for the coagulated and/or treated membrane can be carried out by any conventional method as long as the method is effective for evaporating residual volatile substances from the membrane.

The gas-separating membrane prepared in accordance with the process of the present invention exhibits such an excellent heat resistance that, even when the membrane is exposed to a high temperature of from 150° to 300° C., the gas-separating activity of the membrane is not changed and the membrane can be used for gas-separation of a gas mixture having an elevated temperature of from 50° to 160° C.

The process of the present invention can produce various types of semipermeable membranes which are suitable for wide uses for separating various fluids from each other, by varying conditions of the process. In the field of separating various liquids from each other, the semipermeable membranes of the present invention can be used as a reverse osmosis membrane or an ultrafiltration membrane. Also, in the field of separating various gases from each other, the semipermeable membranes of the present invention can be used for separating carbon monoxide from hydrogen, methane from hydrogen and oxygen from nitrogen gas.

The present invention will be further illustrated by means of the following examples, which are only illustrative and not limitative thereof.

In the following examples, the logarithmic viscosity of imide polymers was determined by the following method.

In the case of a polyamic acid, the polymer is dissolved at a concentration of 0.5 g in 100 ml of N-methyl-2-pyrrolidone. The viscosity of the solution was measured at a temperature of 30° C.

In the case of polyimide, the polymer was dissolved at a concentration of 0.5 g in 100 ml of a mixture of 4 parts by volume of p-chlorophenol and 1 part by volume of o-chlorophenol. The viscosity of the solution was measured at a temperature of 30° C.

The measured value of the viscosity of the solution was converted into a logarithmic (inherent) viscosity of the polymer in accordance with the following equation.

$$\text{Logarithmic viscosity } (\zeta) = \frac{\text{natural logarithm}\left(\frac{\text{viscosity of solution}}{\text{viscosity of solvent}}\right)}{\text{Concentration of polymer in solution}}$$

The degree of imidization of the polyimide was determined by the following method.

An imide polymer in the form of fine particles was subjected to an infrared-ray absorption spectrum analysis. The amount of the imide structure was determined from heights of absorption peaks at 1780 cm$^{-1}$ and 1720 cm$^{-1}$, and the amount of the amide structure was determined from height of absorption peaks at 3300 cm$^{-1}$ and 1640 cm$^{-1}$.

The water-permeability of the polyimide semipermeable membrane was determined in such a manner that the membrane was placed in a reverse osmosis testing apparatus, an aqueous solution of 0.5% by weight of sodium chloride was supplied to the apparatus, and a reverse osmosis procedure was applied to the membrane under a pressure of 40 kg/cm$^2$G at a temperature of 20° C. The resultant water-permeability is expressed in a unit of m$^3$/m$^2$.day.

The salt-rejection RS of the polyimide semipermeable membrane was determined from the equation:

$$RS(\%) = (1 - C/Co) \times 100$$

wherein Co represents a concentration of sodium chloride in an aqueous solution thereof to be supplied to the reverse osmosis procedure and C represents a concentration of sodium chloride in an aqueous solution thereof which has been passed through the membrane.

The gas-permeability of the polyimide semipermeable membrance was determined by the following gas-transmission test. In the test, a gas-separating membrane was placed in a stainless steel cell having an area of 14.65 cm$^2$, each of oxygen gas, nitrogen gas, hydrogen gas and carbon monoxide gas was supplied to the cell under a pressure of 0.5 kg/cm$^2$G or 3.0 kg/cm$^2$G. An amount (volume) of gas passed through the membrane was measured by using a flow meter.

The gas-permeability of each gas was calculated from the equation:

$$\text{Gas-permeability (cm}^3\text{/cm}^2\text{.sec.cm Hg)} = X/(A \times T \times D)$$

wherein X represents an amount (volume) in cm$^3$ of the gas passed through the membrane, A represents a surface area in cm$^2$ of the membrane through which the gas passed, T represents a transmission time in sec. of the gas through the membrane and D represents a difference in pressure in cmHg between the gas-supply side and the opposite side of the membrane.

Reference Examples 1 through 7

(Preparation of imide polymers by a two-step method)

In each of Reference Examples 1 through 7, a mixture of 40 millimoles of the type of a tetracarboxylic dianhydride and 40 millimoles of the type of an aromatic diamine indicated in Table 1 and 180 g of dimethyl acetamide (DMA) was placed in a separable flask with a stirrer and a conduit for introducing thereinto nitrogen gas. The mixture was subjected to a polymerization reaction at a temperature of 20° C. for a period of time indicated in Table 1 while flowing nitrogen gas through the flask, to prepare polyamic acid. The resultant polymerization mixture was cooled to a temperature of 10° C. or less and, then, mixed with 180 g of dimethyl acetamide, 240 millimoles of acetic anhydride and 240 millimoles of pyridine. The mixture was homogenized by stirring it, and then, gradually heated and maintained at a temperature of about 30° C. for about 20 minutes so as to allow the resultant imide polymer to precipitate in the form of fine particles from the polymerization mixture. Thereafter, the polymerization mixture was heated to a temperature of from 70° to 80° C. and that temperature was maintained for 30 minutes or more to complete the imidization reaction.

The polymerization mixture containing the imide polymer powder was added to a large amount of methyl alcohol, the admixture was filtered to separate the imide polymer powder. The imide polymer powder was washed with methyl alcohol and, then, dried under a reduced pressure.

The properties of the resultant imide polymer are indicated in Table 1.

Reference Example 8

(Preparation of imide polymer by a single step method)

The same separable flask as that mentioned in Referential Examples 1 through 7 was charged with 20 millimoles of 3,3',4,4'-biphenyltetracarboxylic dianhydride, 20 millimoles of 4,4'-diaminediphenyl ether and 90 g of p-chlorophenol, the temperature of the reaction mixture was raised from room temperature to 180° C. in 40 minutes and maintained at 180° C. for 4 hours, while flowing nitrogen gas through the flask to carry out a polymerization and imidization reactions in a single step. A viscous imide polymer solution was obtained. The degree of imidization and the logarithmic viscosity of the resultant imide polymer are indicated in Table 1.

evaporate a portion of the solvent from the thin layer of the dope.

This partially dried thin layer of the dope was immersed in a coagulating liquid consisting of one part by volume of water and one part by volume of methyl alcohol at a temperature of from 0° to 3° C. The immersion was continued for about 4 hours so as to completely coagulate the thin layer of the dope. The resultant imide polymer membrane was immersed in methyl

TABLE 1

| Ref. Example No. | Component of imide polymer | | Polymerization | | Imide polymer | |
|---|---|---|---|---|---|---|
| | Acid component | Diamine component | Type | Time (hr) | Degree of imidization (%) | Logarithmic viscosity |
| 1 | S—BPDA | DADE | Two-step method | 2.5 | 95% or more | 1.0 |
| 2 | S—BPDA | DADE | Two-step method | 4 | 95% or more | 1.64 |
| 3 | S—BPDA | DADE | Two-step method | 5 | 95% or more | 1.90 |
| 4 | S—BPDA | o-DAN | Two-step method | 4 | 95% or more | 1.76 |
| 5 | S—BPDA | m-DADS | Two-step method | 30 | 95% or more | 0.579 |
| 6 | S—BPDA | p-DADS | Two-step method | 30 | 95% or more | 0.381 |
| 7 | a-BPDA | DADE | Two-step method | 4 | 95% or more | 0.47 |
| 8 | S—BPDA | DADE | Single-step method | 4 | 90% or more | 2.60 |

Note:
S—BPDA ... 3,3',4,4'-biphenyltetracarboxylic dianhydride
a-BPDA ... 2,3,3',4'-biphenyltetracarboxylic dianhydride
DADE ... 4,4'-diaminodiphenyl ether
o-DAN ... o-dianisidine
m-DADS ... m-diaminodiphenylsulfone (3,3'-diaminodiphenylsulfone)
p-DADS ... p-diaminodiphenylsulfone (4,4'-diaminodiphenylsulfone)

EXAMPLES 1 THROUGH 11

In each of Examples 1 and 2, 10 g of the imide polymer which had been prepared in Reference Example 1 and 90 g of p-chlorophenol were placed in a separable flask with a stirrer. The imide polymer was dissolved in the p-chlorophenol at a temperature of from 80° to 90° C., and the resulting solution was refined by means of a pressure filtration apparatus. In the apparatus, the filter was composed of two filter papers which do not allow particles having a size of 5 microns or more to pass therethrough, a 400 mesh stainless steel net and a 100 mesh metal net.

The filtered solution of the imide polymer was heated and, optionally, exposed to a reduced pressure to completely degas from the solution. The resultant solution was used as a dope for preparing a thin layer. The dope was spread on a surface of a clean flat glass plate at a temperature of from 50° to 60° C. by using a doctor blade to form a thin layer of the dope having a uniform thickness of about 100 microns. The thin layer of the dope on the glass plate was placed in a hot air dryer. Hot air having a temperature as indicated in Table 2 was blown toward the upper surface of the thin layer of the dope for a period of time indicated in Table 2, so as to alcohol for 4 hours or more and, then, in an ion-exchanged water for 4 hours or more, to completely eliminate the residual solvent from the membrane.

In Examples 3 through 6, the same procedures as those mentioned in Example 1 were carried out except that the imide polymer prepared in Reference Example 2 was used in place of that in Reference Example 1.

In Examples 7 through 9, the same procedures as those mentioned in Example 1 were carried out except that the imide polymer prepared in Reference Example 3 was used in place of that in Referential Example 1.

In Example 10, the same procedures as those described in Example 1 were carried out, except that the imide polymer prepared in Referential Example 4 was used instead of that of Referential Example 1, and the resultant membrane was immersed in hot water at a temperature of 90° C. for 15 minutes, after the immersion in the ion-exchanged water.

In Example 11, the same procedures as those described in Example 1 were carried out, except that the imide polymer prepared in Reference Example 5 was used in place of the imide polymer of Reference Example 1.

The properties of the resultant membranes are indicated in Table 2.

TABLE 2

| Example No. | Imide polymer | | | Drying procedure | | Resultant membrane | |
|---|---|---|---|---|---|---|---|
| | Type | Component monomer | Logarithmic viscosity | Temperature (°C.) | Time (min) | Water-permeability (m³/m² · day) | Salt-rejection (%) |
| 1 | Referential Example 1 | S—BPDA DADE | 1.0 | 15 | 3 | 0.43 | 90.2 |
| 2 | Referential Example 1 | S—BPDA DADE | 1.0 | 60 | 3 | 0.23 | 96.4 |
| 3 | Referential | S—BPDA | 1.64 | 60 | 1 | 0.14 | 97.8 |

TABLE 2-continued

| Example No. | Imide polymer Type | Component monomer | Logarithmic viscosity | Drying procedure Temperature (°C.) | Time (min) | Resultant membrane Water-permeability ($m^3/m^2 \cdot day$) | Salt-rejection (%) |
|---|---|---|---|---|---|---|---|
| 4 | Referential Example 2 | S—BPDA DADE | 1.64 | 60 | 3 | 0.10 | 97.2 |
| 5 | Referential Example 2 | S—BPDA DADE | 1.64 | 60 | 5 | 0.11 | 99.1 |
| 6 | Referential Example 2 | S—BPDA DADE | 1.64 | 60 | 10 | 0.03 | 99.3 |
| 7 | Referential Example 3 | S—BPDA DADE | 1.90 | 60 | 1 | 0.28 | 90.8 |
| 8 | Referential Example 3 | S—BPDA DADE | 1.90 | 60 | 3 | 0.16 | 94.7 |
| 9 | Referential Example 3 | S—BPDA DADE | 1.90 | 60 | 10 | 0.12 | 95.1 |
| 10 | Referential Example 4 | S—BPDA o-DAN | 1.76 | 60 | 3 | 0.09 | 93.2 |
| 11 | Referential Example 5 | S—BPDA m-DADS | 0.58 | 60 | 3 | 0.07 | 99.7 |

EXAMPLES 12 THROUGH 18

In each of Examples 12 through 18, a high molecular weight imide polymer (A) which had been prepared in the referential example specified in Table 3 was mixed with a low molecular weight imide polymer (B) which had been prepared in the referential example specified in Table 3, the mixing weight ratio of the imide polymer (A) to the imide polymer (B) was as indicated in Table 3, and the mixture was dissolved at a concentration as indicated in Table 3 in p-chlorophenol, to provide a dope. The same membrane-preparing procedures as those described in Example 4 were carried out, except that the above-mentioned dope was used. An asymmetric semipermeable membrane was obtained. The properties of the membrane are indicated in Table 3.

COMPARISON EXAMPLE 1

A separable flask with a stirrer and a conduit for introducing nitrogen gas thereinto, was charged with a reaction mixture consisting of 20 millimoles of 3,3',4,4'-biphenyl tetracarboxylic dianhydride, 20 millimoles of 4,4'-diaminodiphenyl ether and 56.2 g of dimethyl acetamide. The reaction mixture was subjected to a polymerization reaction at a temperature of 25° C. for three hours, while flowing nitrogen gas through the flask. A solution of about 15% by weight of a polyamic acid was obtained. The polyamic acid exhibited a logarithmic viscosity of 1.67, determined at a concentration of 0.5% by weight, in a solvent consisting of dimethyl acetamide, at a temperature of 30° C.

The polyamic acid solution was filtered and degased, and then, used as a dope for forming a thin layer on a

TABLE 3

| Example No. | Types of component imide polymers (A) and (B) | Type of component monomers in imide polymer | Mixed imide polymer dope Logarithmic viscosity of imide polymer | Mixing ratio A/B | Concentration of mixed imide polymer (wt %) | Properties of semipermeable membrane Water-permeability ($m^3/m^2 \cdot day$) | Salt-rejection (%) |
|---|---|---|---|---|---|---|---|
| 12 | (A) Referential Example 3 | S—BPDA DADE | 1.90 | 1/2 | 15 | 0.071 | 99.2 |
|    | (B) Referential Example 7 | a-BPDA DADE | 0.47 | | | | |
| 13 | (A) Referential Example 3 | S—BPDA DADE | 1.90 | 3/2 | 12.5 | 0.45 | 95.5 |
|    | (B) Referential Example 7 | a-BPDA DADE | 0.47 | | | | |
| 14 | (A) Referential Example 4 | S—BPDA o-DAN | 1.76 | 5/2 | 11.7 | 0.24 | 68.2 |
|    | (B) Referential Example 7 | a-BPDA DADE | 0.47 | | | | |
| 15 | (A) Referential Example 4 | S—BPDA o-DAN | 1.76 | 5/2 | 11.7 | 0.12 | 89.4 |
|    | (B) Referential Example 5 | S—BPDA m-DADS | 0.58 | | | | |
| 16 | (A) Referential Example 8 | S—BPDA DADE | 2.60 | 3/2 | 11.0 | 0.95 | 91.8 |
|    | (B) Referential Example 6 | S—BPDA p-DADS | 0.38 | | | | |
| 17 | (A) Referential Example 3 | S—BPDA DADE | 1.90 | 5/2 | 12.0 | 0.81 | 97.0 |
|    | (B) Referential Example 5 | S—BPDA m-DADS | 0.58 | | | | |
| 18 | (A) Referential Example 8 | S—BPDA DADE | 2.60 | 5/2 | 8.0 | 1.53 | 88.6 |
|    | (B) Referential Example 5 | S—BPDA m-DADS | 0.58 | | | | | surface of a cleaned glass plate at room temperature. The thickness of the thin layer of the dope was adjusted to about 50 microns by using a doctor blade. The thin layer of the dope was partially dried by blowing air having a temperature of approximately 25° C. toward the layer for about one minute. The partially dried layer of the dope was immersed in a coagulating liquid consisting of benzene containing one molar concentration of triethylamine and one molar concentration of acetic anhydride while maintaining the temperature of the coagulating liquid at about 25° C. for 15 minutes and, then, at 60° to 75° C. for 1.5 hours. During this procedure, the polyamic acid was imidized and the thin layer of the dope was coagulated. The resultant membrane was washed with benzene, next, with ethyl alcohol containing 2% by weight of benzene and, finally, with water. An imide polymer semipermeable membrane was obtained. This semipermeable membrane exhibited an extremely poor water-permeability of 0.0017 $m^3/m^2$.day and a salt-rejection of 96.7%.

EXAMPLE 19

A separable flask having a stirrer and an inlet conduit for nitrogen gas, was charged with a reaction mixture consisting of 40 millimoles of 2,3,3',4'-biphenyltetracarboxylic dianhydride (a-BPDA), 40 millimoles of 4,4'-diamine-diphenyl ether and 70 ml of dimethyl acetamide. The reaction mixture was subjected to a polymerization, at a temperature of 20° C., for 3.5 hours, while flowing nitrogen gas through the flask, in order to prepare a polyamic acid. The reaction mixture was cooled to a temperature not exceeding 10° C., and mixed with 100 ml of dimethyl acetamide, 240 millimoles of acetic anhydride and 240 millimoles of pyridine while homogenizing the mixture by stirring it. The result homogenized mixture was gradually heated, and allowed to stand, at a temperature of about 30° C., for 20 minutes, so as to allow the resultant imide polymer to deposit from the mixture, and then, heated to a temperature of from 70° to 80° C. and allowed to stand at that temperature for 30 minutes, so as to complete the imidization.

The reaction mixture containing the resultant imide polymer in the form of fine particles, was added into a large amount of methyl alcohol. The admixture was filtered to separate the imide polymer particles from the admixture, washed with methyl alcohol and, then, dried under a reduced pressure. The imide polymer was obtained in the form of a powder. The resultant imide polymer exhibited a degree of imidization of 95% or more and a logarithmic viscosity of 0.71.

A mixture of 20 g of the imide polymer powder and 80 g of p-chlorophenol was placed in a separable flask having a stirrer, converted into a solution at a temperature of 80° to 90° C. and, then, refined by filtering it by using the same pressure filter as that described in Example 1.

The solution was heated to a temperature of 80° C. and degased under a reduced pressure to provide a dope for producing a semipermeable membrane. The dope was spread on a surface of a cleaned glass plate to form a thin layer of the dope. The thickness of the layer of the dope was adjusted to 100 microns by using a doctor blade. The thin layer of the dope was placed in a hot air dryer and hot air having a temperature of 60° C. was blown toward the surface of the dope layer to evaporate a portion of the solvent from the layer. This partially dried layer of the dope was immersed in a coagulating liquid consisting of water containing 50% by weight of dimethyl sulfoxide or dioxane for 4 hours, to coagulate the dope layer. The coagulated membrane was immersed in methyl alcohol for 4 hours and, then, in an ion-exchanged water for 4 hours to completely remove the residual solvent from the membrane.

The resultant semipermeable membrane exhibited a water-permeability of 0.04 $m^3/m^2$.day and a salt-rejection of 90.0%, when the coagulating liquid contained dimethyl sulfoxide. When the coagulating liquid contained dioxane, the resultant semipermeable membrane exhibited a water-permeability of 0.39 $m^3/m^2$.day and a salt-rejection of 69.0%.

Reference Examples 9 through 14

In each of Referential Examples 9 through 13, a separable flask having a stirrer and an inlet conduit for nitrogen gas was charged with a reaction mixture consisting of 20 millimoles of 3,3',4,4'-biphenyltetracarboxylic acid dianhydride (S-BPDA), 16 millimoles of 4,4'-diaminodiphenyl ether (DADE), 4 millimoles of the aromatic diamine compound indicated in Table 4 and 90 g of p-chlorophenol. The reaction mixture was heated to room temperature to 180° C. over 40 minutes and, then, the temperature of the reaction mixture was maintained at that temperature for a period of time as indicated in Table 4 while flowing nitrogen gas through the flask, in order to polymerize and imidize, in a single step, the reaction mixture. A viscous solution containing imide copolymer was obtained.

The imide copolymer exhibited a degree of imidization and a logarithmic viscosity as indicated in Table 4. The concentration of the imide copolymer in the solution was as indicated in Table 4.

In Reference Example 14, the same procedures as those described in Referential Example 9 were carried out, except that the reaction mixture contained 20 millimoles of DADE and no other aromatic diamine contained. The results are indicated in Table 4.

TABLE 4

| | Preparation of imide polymer | | | | Resultant solution | | |
| --- | --- | --- | --- | --- | --- | --- | --- |
| Reference Example No. | Amount of S—BPDA (millimole) | Type of diamine compound | Amount of diamine compound (millimole) | Reaction time (hr) | Concentration of imide polymer (wt %) | Imide polymer Degree of imidization (%) | Logarithmic viscosity $\eta$ |
| 9 | 20 | DADE P—DADS | 16 4 | 8 | 18 | 90 or more | 0.9 |
| 10 | 20 | DADE P—ABH | 16 4 | 8 | 10 | 90 or more | 1.1 |
| 11 | 20 | DADE 2,6-DAP | 16 4 | 3 | 10 | 90 or more | 1.0 |
| 12 | 20 | DADE M—DAB | 16 4 | 4 | 10 | 90 or more | 0.8 |
| 13 | 20 | DADE 3,5-DABA | 16 4 | 4 | 10 | 90 or more | 1.2 |

TABLE 4-continued

| | Preparation of imide polymer | | | | Resultant solution | | |
|---|---|---|---|---|---|---|---|
| | | | Amount of | | Concentration | Imide polymer | |
| Reference Example No. | Amount of S—BPDA (millimole) | Type of diamine compound | diamine compound (millimole) | Reaction time (hr) | of imide polymer (wt %) | Degree of imidization (%) | Logarithmic viscosity $\eta$ |
| 14 | 20 | DADE | 20 | 4 | 10 | 90 or more | 1.6 |

Note:
P—DADS ... 4,4'-diamino diphenyl sulfone
P—ABH ... 4-aminobenzhydrazide
2,6-DAP ... 2,6-diaminopyridine
M—DAB ... 4-methoxy-1,3-diaminobenzene
3,5-DABA ... 3,5-diaminobenzoic acid

EXAMPLES 20 THROUGH 25

In each of Examples 20 through 25, the same procedures as those described in Example 2 were applied to the imide copolymer or polymer solution which had been prepared in the referential example as indicated in Table 5, except that the immersion procedures in the coagulating liquid and the ion-exchanged water were carried out for 4.5 hours.

An asymmetric reverse osmotic semipermeable membrance having the water-permeability and salt-rejection as indicated in Table 5 was obtained.

TABLE 5

| | Imide polymer | | Membrane | |
|---|---|---|---|---|
| Example No. | Prepared in | Molar ratio of DADE to other diamine compound | Water-permeability $(m^3/m^2 \cdot day)$ | Salt-rejection (%) |
| 20 | Referential Example 9 | DADE/S—DADS = 4/1 | 0.118 | 99.1 |
| 21 | Referential Example 10 | DADE/P—ABH = 4/1 | 0.115 | 99.5 |
| 22 | Referential Example 11 | DADE/2,6-DAP = 4/1 | 0.142 | 99.4 |
| 23 | Referential Example 12 | DADE/M—DAB = 4/1 | 0.150 | 98.2 |
| 24 | Referential Example 13 | DADE/3,5-DABA = 4/1 | 0.108 | 98.4 |
| 25 | Referential Example 14 | DADE alone | 0.10 | 97.2 |

Reference Examples 15 through 17

In each of Reference Examples 15, 16 and 17, the same two-step (polymerization-imidization) process as that described in Reference Example 1 was carried out, except that the types and amounts of the tetracarboxylic dianhydride and diamine compounds, and the reaction times were as indicated in Table 6. The results are indicated in Table 6.

Reference Example 18

The same single step polymerization-imidization process as that described in Reference Example 8 was carried out, except that the reaction mixture consisted of 20 millimoles of 3,3',4,4'-biphenyltetracarboxylic dianhydride (S-BPDA), 4 millimoles of 4,4'-diaminodiphenyl ether (DADE), 16 millimoles of o-dianisidine (o-DAN) and 89 g of p-chlorophenol (PCP). The results are indicated in Table 6.

Reference Example 19

The same single step polymerization-imidization process as that described in Reference Example 18 was carried out, except in the reaction mixture, DADE, o-DAN and PCP were respectively used in amounts of 8 millimoles, 12 millimoles and 87 g. The results are indicated in Table 6.

TABLE 6

| | Imide polymer preparation | | | | | Resultant polymer | | |
|---|---|---|---|---|---|---|---|---|
| Reference Example No. | Acid component | | Diamine component | | Polymerization imidization process | | | |
| | Type | Amount (m · mol) | Type | Amount (m · mol) | Type of process | Time (hr) | Degree of imidization (%) | Logarithmic viscosity |
| 15 | a-BPDA | 40 | DADE | 40 | Two step process | 10 | 95 or more | 0.71 |
| 16 | S—BPDA | 40 | DADM * | 40 | Two step process | 4 | 95 or more | 1.60 |
| 17 | S—BPDA | 40 | o-DAN | 40 | Two step process | 4 | 95 or more | 1.65 |
| 18 | S—BPDA | 20 | DADE o-DAN | 4 16 | Single step process | 4 | 95 or more | 1.30 |
| 19 | S-BPDA | 20 | DADE o-DAN | 8 12 | Single step process | 4 | 95 or more | 1.15 |

Note:
DADM ... 4,4'-diaminodiphenyl methane

Reference Examples 20 through 29

In each of Referential Examples 20 through 29, the imide polymer which had been prepared in the referential example as indicated in Table 7 was dissolved, in an amount as indicated in Table 7, in a mixed solvent consisting of p-chlorophenol (PCP) and another solvent was indicated in Table 7 in amounts respectively indicated in Table 7. The resultant dope exhibited a rotation viscosity as indicated in Table 7.

TABLE 7

| | Composition of dope | | | | | Rotation viscosity of dope at 60° C. (poise) |
|---|---|---|---|---|---|---|
| | Imide polymer | | Mixed solvent | | | |
| | Prepared in | | PCP | Another solvent | | |
| Reference Example No. | Referential Example No. | Amount (g) | Amount (g) | Type | Amount (g) | |
| 20 | 1 | 10 | 60 | $CS_2$ | 30 | 230 |
| 21 | 2 | 10 | 60 | $CS_2$ | 30 | 280 |
| 22 | 2 | 10 | 80 | $CH_2Cl_2$ | 10 | 420 |
| 23 | 2 | 10 | 80 | $CS_2$ | 10 | 400 |
| 24 | 3 | 10 | 90 | — | 0 | 650 |
| 25 | 3 | 5 | 47.5 | $CS_2$ | 47.5 | 40 |
| 26 | 15 | 20 | 80 | — | 0 | 70 |
| 27 | 16 | 10 | 90 | — | 0 | 3500 |
| 28 | 17 | 10 | 90 | — | 0 | 4000 |
| 29 | 2 | 5 | 95 | — | 0 | 300 |

EXAMPLE 26

The imide polymer dope prepared in Reference Example 20 was spread on a surface of a glass plate at room temperature to form a thin layer of the dope having a thickness of 0.1 mm. The thin layer was allowed to stand in the atmosphere for 3 minutes while heating it to a temperature of 60° C., so as to evaporating a portion of the solvent from the surface of the thin layer. The partially dried thin layer of the dope was immersed in a coagulating liquid consisting of 7 parts by volume of methyl alcohol and 3 parts by volume of water, at a temperature of 0° C., for 2 hours. Next, the coagulating liquid was replaced by, water, and the coagulated membrane which had been interposed between two pieces of filter paper was treated with the water at a temperature of 50° C. for 10 minutes and, then, at an elevated temperature of 90° C. for 15 minutes. The treated membrane was immersed in methyl alcohol while heating it at a temperature of about 65° C., under an ambient pressure, for 2 hours, while refluxing the vapor generated from the methyl alcohol bath to remove water from the membrane. The membrane was removed from the methyl alcohol and, then, allowed to stand in the atmosphere, at a room temperature, for 24 hours, to remove methyl alcohol from the membrane. A gas separating imide polymer membrane was obtained.

The gas separating membrane was subjected to a gas transmission test, under a gas pressure of 3 kg/cm²G, at a temperature of 25° C. The result of the test is indicated in Table 8.

The gas separating membrane which had been interposed between two pieces of filter paper was heat treated in a nitrogen atmosphere, at a temperature of 160° C., for 3 hours. The heat-treated gas separating membrane was subjected to gas transmission tests, under a gas pressure of 3 kg/cm²G, at temperatures of 25° C. and 80° C. The results are indicated in Table 8.

EXAMPLE 27

The same procedures as those described in Example 26 were carried out, except that the imide polymer dope used was the one prepared in Reference Example 21, the temperature at which the thin layer of the dope on the glass plate surface was heated was 40° C. and the coagulating liquid consisted on one part by volume of methyl alcohol and one part by volume of water.

The result of the gas transmission test, under a gas pressure of 3 kg/cm²G, at a temperature of 25° C., in indicated in Table 8.

EXAMPLE 28

The same procedures as those described in Example 26 were carried out, except that the imide polymer dope prepared in Referential Example 21 was used, and the coagulating liquid consisted of methyl alcohol. The result of the gas transmission test, under a gas pressure of 0.5 kg/cm²G, at a temperature of 25° C., is indicated in Table 8.

EXAMPLE 29

The same procedures as those described in Example 27 were carried out, except that the imide polymer dope prepared in Referential Example 22 was used, and the thin layer of the dope on the glass plate surface was heated at a temperature of 60° C. to partially dry the thin layer of the dope. The result of the gas transmission test, under a gas pressure of 3 kg/cm²G, at a temperature of 25° C., is indicated in Table 8.

EXAMPLE 30

The same procedures as those described in Example 26 were carried out, except that the imide polymer dope prepared in Referential Example 23 was used, and the coagulating liquid consisted of one part by volume of isopropyl alcohol and one part by volume of water. The result of the gas transmission test, under a gas pressure of 3 kg/cm²G, at 25° C., is indicated in Table 8.

EXAMPLE 31

The same procedures as those described in Example 26 were carried out, except that the imide polymer dope prepared in Reference Example 21 was used. The results of the gas transmission tests are indicated in Table 8.

TABLE 8

| | Preparation of gas separating membrane | | | | |
|---|---|---|---|---|---|
| | | | | Heat treatment | |
| | Imide | Partial drying | Coagulating liquid | In water | In nitrogen gas |

TABLE 8-continued

| Example No. | polymer dope prepared in | temperature (°C.) | Time (min) | Component | Mixing ratio by volume | Temperature (°C.) | Time (min) | Temperature (°C.) | Time (hr) |
|---|---|---|---|---|---|---|---|---|---|
| 26 | Referential Example 20 | 60 | 3 | $CH_3OH$/water | 7/3 | 50<br>90 | 10<br>15 | —<br>160 | —<br>3 |
| 27 | Referential Example 21 | 40 | 3 | $CH_3OH$/water | 1/1 | — | — | — | — |
| 28 | Referential Example 21 | 60 | 3 | $CH_3OH$ | above | 50<br>90 | 10<br>15 | — | — |
| 29 | Referential Example 22 | 60 | 3 | $CH_3OH$/water | 1/1 | — | — | — | — |
| 30 | Referential Example 23 | 60 | 3 | $CH(CH_3)_2OH$/water | 1/1 | 50<br>90 | 10<br>15 | — | — |
| 31 | Referential Example 23 | 60 | 3 | $CH_3OH$/water | 7/3 | 50<br>90 | 10<br>15 | 160 | 3 |

| | Gas transmission test | | | | | |
|---|---|---|---|---|---|---|
| | Test condition | | Transmission | | | |
| Example No. | Temperature (°C.) | Gas pressure ($kg/cm^2$) | $H_2$ ($\times 10^{-5}$) | $O_2$ ($\times 10^{-5}$) | CO ($\times 10^{-5}$) | $N_2$ ($\times 10^{-5}$) |
| 26 | 25 | 3 | 4.3 | 0.78 | 0.45 | 0.37 |
|  | 25 | 3 | 6.0 | 0.85 | 0.48 | 0.39 |
|  | 80 | 3 | 16 | — | 1.6 | — |
| 27 | 25 | 3 | 0.48 | 0.035 | 0.02 | 0.012 |
| 28 | 25 | 0.5 | 1800 | — | 562 | — |
| 29 | 25 | 3 | 0.19 | 0.013 | 0.005 | 0.14 |
| 30 | 25 | 3 | 4.9 | — | 0.75 | — |
| 31 | 25 | 3 | 9.9 | — | 0.66 | — |
|  | 25 | 3 | 6.5 | — | 0.32 | — |
|  | 80 | 3 | 13 | — | 0.78 | — |

EXAMPLE 32

The same procedures as those described in Referential Example 26 were carried out, except that the imide polymer dope prepared in Reference Example 24 was spread at a temperature of 60° C. on a surface of a glass plate, and the coagulating liquid consisted of one part by volume of tetrahydrofuran and one part by volume of water. The result of the gas transmission test, under a gas pressure of 3 kg/cm²G, at 25° C., is indicated in Table 9.

EXAMPLE 33

The same procedures as those described in Example 27 were carried out, except that the imide polymer dope prepared in Reference Example 24 was spread on a surface of a glass plate at a temperature of 40° C., and the coagulating liquid consisted of one part by volume of ethylene glycol and one part by volume of water. The result of the gas transmission test, under a gas pressure of 3 kg/cm²G, at 25° C., is indicated in Table 9.

EXAMPLE 34

The same procedures as those described in Example 27 were carried out, except that the imide polymer dope prepared in Reference Example 24 was spread on a surface of a glass plate at a temperature of 60° C., to form a thin layer of the dope having a thickness of 0.2 mm and the coagulating liquid consisted of methyl alcohol alone. A gas transmission test was applied to the gas separating membrane, under a gas pressure of 0.5 kg/cm²G, at 25° C.

The membrane was interposed between a pair of pieces of filter paper and heated in a nitrogen atmosphere, at a temperature of 260° C., for 6 hours. The same gas transmission test as that mentioned above was applied to the heat-treated membrane. The results of the above-mentioned tests are indicated in Table 9.

EXAMPLE 35

The same procedures as those described in Example 28 were carried out, except that the imide polymer dope prepared in Reference Example 25 was used. The result of the gas transmission test applied to the resultant gas separating membrane, under a gas pressure of 0.5 kg/cm²G, at a temperature of 25° C. is indicated in Table 9.

EXAMPLES 36 THROUGH 38

In each of Examples 36 through 38, the same procedures as those described in Example 26 were carried out, except that the imide polymer dope prepared in Reference Example 26 was used and the coagulating liquid consisted of acetone in Example 36, a mixture of 3 parts by volume of dimethyl acetamide and 1 part by volume of water in Example 37, and 1 part by volume of dimethyl acetamide and 1 part by volume of water in Example 38.

The gas transmission test was carried out for the gas separating membrane obtained in Examples 36 and 37, under a gas pressure of 0.5 kg/cm²G, at 25° C., and for the gas separating membrane obtained in Example 38, under a gas pressure of 1 kg/cm²G, at 25° C. The results are indicated in Table 9.

EXAMPLE 39

The same procedures as those described in Example 36 were carried out, except that the imide polymer dope prepared in Reference Example 27 was spread on a glass surface at 60° C. The gas transmission test was carried out, under a gas pressure of 0.5 kg/cm₂G, at 25° C. The result is indicated in Table 9.

EXAMPLE 40

The same procedures as those described in Example 26 were carried out, except that the imide polymer dope prepared in Reference Example 28 was used. The gas transmission test was applied to the resultant gas separating membrane, under a gas pressure of 3 kg/cm²G, at 25° C. The result is indicated in Table 9.

ing of benzene containing one molar concentration of triethylamine and one molar concentration of acetic anhydride, at ambient temperature, for 15 minutes, and

TABLE 9

Preparation of gas separating membrane

| Example No. | Imide polymer dope prepared in | Partial drying temperature (°C.) | Partial drying Time (min) | Coagulating liquid Component | Coagulating liquid Mixing ratio by volume | Heat treatment In water Temperature (°C.) | Heat treatment In water Time (min) | Heat treatment In N₂ gas Temperature (°C.) | Heat treatment In N₂ gas Time (hr) |
|---|---|---|---|---|---|---|---|---|---|
| 32 | Referential Example 24 | 60 | 3 | Tetrahydrofuran/water | 1/1 | 50 / 90 | 10 / 15 | — | — |
| 33 | Referential Example 24 | 40 | 3 | Ethylene glycol/water | 1/1 | — | — | — | — |
| 34 | Referential Example 24 | 60 | 3 | CH₃OH | alone | — | — | 260 | 6 |
| 35 | Referential Example 25 | 60 | 3 | CH₃OH | alone | 50 / 90 | 10 / 15 | — | — |
| 36 | Referential Example 26 | 60 | 3 | acetone | alone | 50 / 90 | 10 / 15 | — | — |
| 37 | Referential Example 26 | 60 | 3 | DMA/water | 3/1 | 50 / 90 | 10 / 15 | — | — |
| 38 | Referential Example 26 | 60 | 3 | DMA/water | 1/1 | 50 / 90 | 10 / 15 | — | — |
| 39 | Referential Example 27 | 60 | 3 | acetone | alone | 50 / 90 | 10 / 15 | — | — |
| 40 | Referential Example 28 | 60 | 3 | CH₃OH/water | 7/3 | 50 / 90 | 10 / 15 | — | — |

Gas transmission test

| Example No. | Test condition Temperature (°C.) | Test condition Pressure (kg/cm²) | Permeability (cm³/cm² · sec · cm Hg) $H_2$ ($\times 10^{-5}$) | Permeability $CO$ ($\times 10^{-5}$) | $H_2/CO$ |
|---|---|---|---|---|---|
| 32 | 25 | 3 | 1.3 | 0.16 | 8 |
| 33 | 25 | 3 | 0.7 | 0.12 | 5.7 |
| 34 | 25 | 0.5 | 11000 | 3900 | 2.8 |
|    | 25 | 0.5 | 11000 | 3900 | 2.8 |
| 35 | 25 | 0.5 | 130 | 36 | 3.6 |
| 36 | 25 | 0.5 | 19000 | 6100 | 3.1 |
| 37 | 25 | 0.5 | 830 | 240 | 3.5 |
| 38 | 25 | 1 | 66 | 17 | 3.9 |
| 39 | 25 | 0.5 | 14000 | 4700 | 3.0 |
| 40 | 25 | 3 | 1.5 | 0.039 | 38 |

Note:
DMA ... dimethyl acetamide

EXAMPLE 41

The same procedures as those mentioned in Example 26 were carried out, except that the imide polymer dope was a solution of 10% by weight of the imide copolymer prepared in Reference Example 18 in p-chlorophenol. The result of the gas transmission test applied to the resultant gas separating membrane, under a gas pressure of 3 kg/cm², at 25° C., is indicated in Table 10.

EXAMPLE 42

The same procedures as those mentioned in Example 26 were carried out, except that the imide polymer dope was a solution of 10% by weight of the imide copolymer prepared in Reference Example 19 in p-chlorophenol. The result of the gas transmission test applied to the resultant gas separating membrane, under a gas pressure of 3 kg/cm²G, at a room temperature, is indicated in Table 10.

Comparison Example 2

A solution of 10% by weight of a polymeric acid in DMA was prepared by the method described in Reference Example 2. The polyamic acid had a logarithmic viscosity of 2.75. The solution was spread on a surface of a glass plate at an ambient temperature to form a thin layer of the solution having a thickness of 0.1 mm. The thin layer was immersed in a coagulating liquid consisting of benzene containing one molar concentration of triethylamine and one molar concentration of acetic anhydride, at ambient temperature, for 15 minutes, and then, at a temperature of 60° C., for 60 minutes, to provide a coagulated imide polymer membrane. The membrane was washed with benzene and, then, with methyl alcohol. Therefore, the washed membrane was removed from the methyl alcohol bath and, then, allowed to stand in atmospheric air for 24 hours to dry it. A gas separating membrane was obtained.

The result of the gas transmission test applied to the membrane, at a gas pressure of 3 kg/cm²G, at a temperature of 25° C., is indicated in Table 10.

TABLE 10

| Example No. | Inside polymer dope prepared in | Gas - separating membrane Gas permeability (cm³/cm² · sec · cm Hg) $H_2$ | $O_2$ | $CO$ | $N_2$ |
|---|---|---|---|---|---|
| Example 41 | Reference Example 18 | $1.9 \times 10^{-6}$ | — | $5.9 \times 10^{-8}$ | — |
| Example 42 | Reference Example 19 | $3.4 \times 10^{-6}$ | — | $1.1 \times 10^{-7}$ | — |
| Comparison Example 2 | Reference Example 2 | $4.1 \times 10^{-7}$ | $3.8 \times 10^{-8}$ | $1.6 \times 10^{-8}$ | $1.3 \times 10^{-8}$ |

Reference Example 30

The imide polymer dope prepared in Reference Example 29 was spread on a surface of a glass plate at a temperature of 60° C. The resultant thin layer of the dope was heated at a temperature of 100° C/., in an air atmosphere, and allowed to stand at that temperature for one hour. A polyimide film having a thickness of 5 microns was obtained.

A gas transmission test, under a gas pressure of 3 Kg/cm² G, at a temperature of 25° C., was applied to the polyimide film. The results were as follows.

| Type of gas | Permeability coefficient (cm³ · cm/cm² · sec · cm Hg) |
|---|---|
| Hydrogen | $4.6 \times 10^{-10}$ |
| Oxygen | $3.5 \times 10^{-11}$ |
| Carbon monoxide | $1.5 \times 10^{-11}$ |
| Nitrogen | $1.3 \times 10^{-11}$ |

The permeability coefficient was calculated in accordance with the equation:

$$\text{Permeability coefficient} = \frac{X \times Th}{A \times T \times D} \text{ (cm}^3 \cdot \text{cm/cm}^2 \cdot \text{sec} \cdot \text{cm Hg)}$$

wherein X represents an amount in cm³ of gas passed through the film, Th represents a thickness in cm of the film, A represents an area in cm² of the film through which the gas passed, T represents a time in seconds during which the gas passed through the film, and D represents a difference between the pressures in cmHg of the gas before and after it passed through the film.

We claim:

1. A process for preparing an aromatic polyimide semipermeable membrane, comprising the steps of:

preparing a solution of an aromatic polyimide material consisting essentially of at least one aromatic polyimide comprising at least 90 molar % of at least one recurring unit of the formula (I):

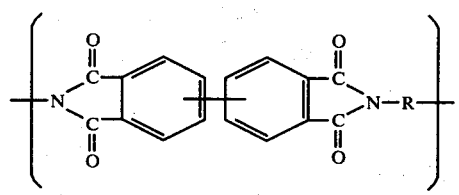

wherein R represents a divalent aromatic radical which is selected from the group consisting of those of the formulae (IV) and (V):

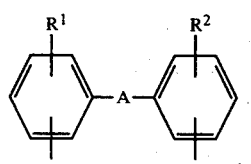

wherein R¹ and R², respectively, represent, independently from each other, a member selected from the group consisting of a hydrogen atom, lower alkyl radicals having 1 to 3 carbon atoms and lower alkoxy radicals having 1 to 3 carbon atoms, and A represents a divalent bond selected from the group consisting of —O—, —S—, —CO—, —SO₂—, —SO—, —CH₂— and —C(CH₃)₂—, and;

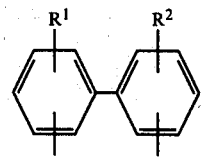

wherein R¹ and R² are as defined above, in a solvent consisting of at least one phenol compound in the state of a liquid or melt;

forming a thin layer of said aromatic polyimide solution; and coagulating said thin layer of said aromatic polyimide solution by bringing said thin layer into contact with a coagulating liquid to form a semipermeable membrane, said coagulating liquid consisting of at least one member selected from the group consisting of lower aliphatic alcohols having 1 to 5 carbon atoms, lower aliphatic ketones having 3 to 5 carbon atoms, ether compounds, amide compounds, dimethylsufoxide, and mixtures of at least one member of the above-mentioned compounds with water.

2. A process as claimed in claim 1, wherein said polyimide material exhibits a logarithmic viscosity of from 0.3 to 7.0, determined at a concentration of 0.5 g per 100 ml of a mixture of 4 parts by volume of p-chlorophenol and 1 part by volume of o-chlorophenol at a temperature of 30° C.

3. A process as claimed in claim 1, wherein said recurring unit of the formula (I) is selected from those of the formulae (II) and (III):

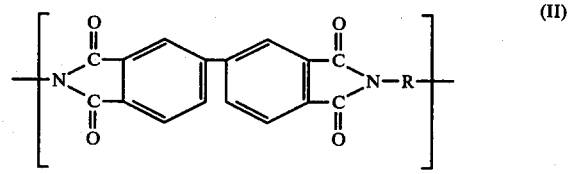

and

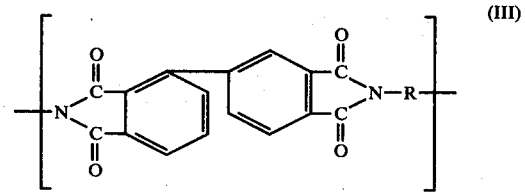

4. A process as claimed in claim 1, wherein said aromatic polyimide comprises at least one recurring unit of the formula (I) in which R represents a divalent aromatic radical of the formula (IV) and at least one recurring unit of the formula (I) in which R represents a divalent aromatic radical selected from the group consisting of those of the formulae (VI) to (IX):

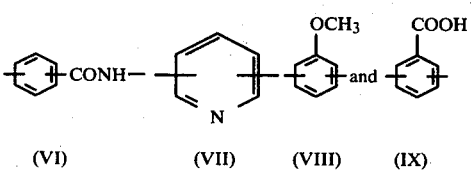

5. A process as claimed in claim 1, wherein said aromatic polyimide is one which has been prepared by the polymerization and the imide ring cyclization of a tetracarboxylic acid component comprising 90 molar % or more of biphenyl tetracarboxylic acid of the formula (X):

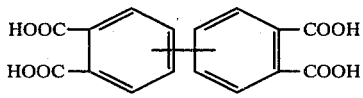
(X)

or its anhydride, salt or ether, with an aromatic diamine component consisting essentially of at least one member selected from the group consisting of diamine compounds of the formula (XI):

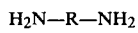
(XI)

wherein R is the same as that defined above.

6. A process as claimed in claim 5, wherein said biphenyl tetracarboxylic acid of the formula (X) is selected from 2,3,3',4'-biphenyl tetracarboxylic acid and 3,3',4,4'-biphenyl tetracarboxylic acid.

7. A process as claimed in claim 5, wherein said aromatic diamine of the formula (XI) is selected from the group consisting of those of the formulae (XII) and (XIII):

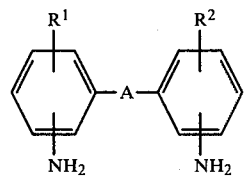
(XII)

wherein $R^1$ and $R^2$ respectively, independently from each other, represent a member selected from the group consisting of a hydrogen atom, lower alkyl radical having 1 to 3 carbon atoms, and lower alkoxy radical having 1 to 3 carbon atoms, and A represents a divalent bond selected from the group consisting of —O—, —S—, —CO—, —SO$_2$—, —SO—, —CH$_2$— and —C(CH$_3$)$_2$—, and;

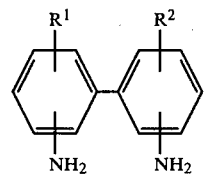
(XIII)

wherein $R^1$ and $R^2$ are as defined above.

8. A process as claimed in claim 5, wherein said aromatic diamine component comprises at least one aromatic diamine selected from the group consisting of those of the formula (XII) and at least one other aromatic diamine selected from the group consisting of those of the formulae (XIV) to (XVII):

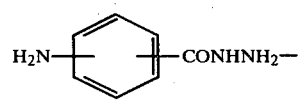
(XIV)

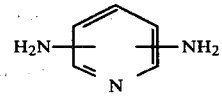
(XV)

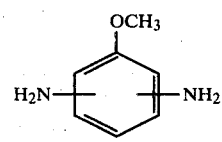
(XVI)

and

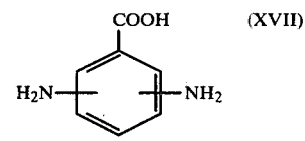
(XVII)

9. A process as claimed in claim 1, wherein said aromatic polyimide polymer comprises 50 to 95 molar % of a recurring unit of the formula (XVIII):

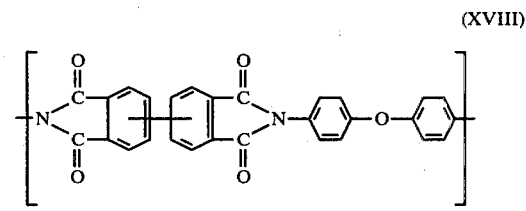
(XVIII)

and 5 to 40 molar % of at least one recurring unit selected from those of the formula (XIX):

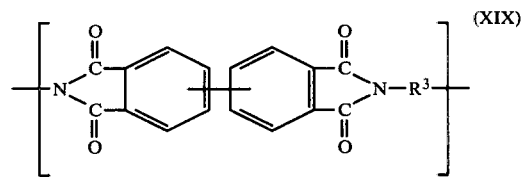
(XIX)

wherein $R^3$ represents a member selected from the group consisting of:

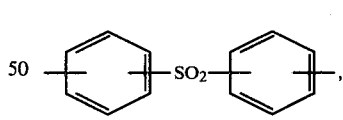

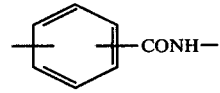

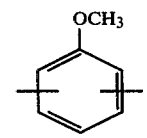

-continued and

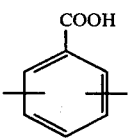

10. A process as claimed in claim 1, wherein said polyimide material consists of a high molecular weight aromatic polyimide component having a logarithmic viscosity of from 0.8 to 7 and a low molecular weight aromatic polyimide component having a logarithmic viscosity of from 0.2 to 0.8.

11. A process as claimed in claim 10, wherein the ratio in weight of said high molecular weight aromatic polyimide component to said low molecular weight aromatic imide polymer component is in a range of from 0.5:1 to 20:1.

12. A process as claimed in claim 1, wherein said phenol compound has a melting point not exceeding 100° C.

13. A process as claimed in claim 1, wherein said phenol compound is selected from the group consisting of phenol, o-, m-, and p-cresols, 3,5-xylenol, 1,4-xylenol, carvacrol, thimol and halogenated phenol compounds.

14. A process as claimed in claim 13, wherein said halogenated phenol compounds are of the formulae:

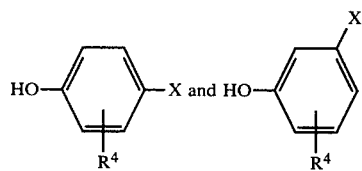

wherein $R^4$ represents a member selected from the group consisting of a hydrogen atom and alkyl radicals having 1 to 3 carbon atoms, and X represents a halogen atom.

15. A process as claimed in claim 13, wherein said halogenated phenol compound is selected from the group consisting of 3-chlorophenol, 4-chlorophenol, 3-bromophenol, 4-bromophenol, 2-chloro-4-hydroxytoluene, 2-chloro-5-hydroxytoluene, 3-chloro-5-hydroxytoluene, 3-chloro-6-hydroxytoluene, 4-chloro-2-hydroxytoluene, 2-bromo-4-hydroxytoluene, 2-bromo-5-hydroxytoluene, 3-bromo-5-hydroxytoluene, 3-bromo-6-hydroxytoluene, 4-bromo-2-hydroxytoluene.

16. A process as claimed in claim 1, wherein the concentration of said polyimide material in said polyimide solution is at least 5% by weight.

17. A process as claimed in claim 1, wherein said polyimide solution has a rotation viscosity of 1000 centipoises or more at a temperature of from 0° to 120° C.

18. A process as claimed in claim 1, wherein said thin layer of said polyimide solution is formed at a temperature of from 0° to 120° C.

19. A process as claimed in claim 1, wherein said thin layer of said polyimide solution is in the form of a flat film, a hollow fiber, or a tube.

20. A process as claimed in claim 1, wherein said thin layer of said polyimide solution has a thickness of from 10 to 500 microns.

21. A process as claimed in claim 1, wherein a portion of said solvent is evaporated from a surface of said thin layer of said polyimide solution, before said coagulating operation.

22. A process as claimed in claim 1, wherein said coagulating liquid consists of a mixture of one part of weight of water and 0.2 to 10 parts by weight of at least one member selected from said lower aliphatic alcohols, lower aliphatic ketones, ether type compounds, amide type compounds and dimethylsulfoxide.

23. A process as claimed in claim 1, wherein said coagulating liquid has a temperature not exceeding 80° C.

24. A process as claimed in claim 1, wherein said coagulated polyimide membrane is washed with at least one member selected from the group consisting of lower aliphatic alcohols having 1 to 5 carbon atoms and lower aliphatic ketones having 3 to 5 carbon atoms.

25. A process as claimed in claim 1 or 24, wherein said membrane is heat-treated with a hot polar solvent at a temperature of from 50° to 150° C.

* * * * *